(12) United States Patent
Goto

(10) Patent No.: US 8,536,438 B2
(45) Date of Patent: Sep. 17, 2013

(54) EFFECTOR AFFIXING DEVICE

(75) Inventor: Toshihiro Goto, Nagoya (JP)

(73) Assignee: Mizuho Gousei Kogyosyo Co., Ltd., Nagoya (JP)

( * ) Notice: Subject to any disclaimer, the term of this patent is extended or adjusted under 35 U.S.C. 154(b) by 0 days.

(21) Appl. No.: 13/702,306

(22) PCT Filed: Jul. 27, 2011

(86) PCT No.: PCT/JP2011/067025
§ 371 (c)(1),
(2), (4) Date: Dec. 6, 2012

(87) PCT Pub. No.: WO2012/053266
PCT Pub. Date: Apr. 26, 2012

(65) Prior Publication Data
US 2013/0077319 A1 Mar. 28, 2013

(30) Foreign Application Priority Data
Oct. 23, 2010 (JP) ................................. 2010-238064

(51) Int. Cl.
*G10H 1/32* (2006.01)
(52) U.S. Cl.
USPC ........................................................ 84/746
(58) Field of Classification Search
USPC ........................................................ 84/746
See application file for complete search history.

(56) References Cited

U.S. PATENT DOCUMENTS

| 5,981,862 | A * | 11/1999 | Geier, Jr. .......................... 84/746 |
| 6,215,055 | B1 * | 4/2001 | Saravis .......................... 84/422.1 |
| 7,476,799 | B2 * | 1/2009 | Purchon et al. .................. 84/746 |
| 2011/0271821 | A1 * | 11/2011 | McKinney et al. ............. 84/746 |

FOREIGN PATENT DOCUMENTS

| JP | 05-57728 U | 7/1993 |
| JP | 3120963 U | 4/2006 |

OTHER PUBLICATIONS

International Search Report for corresponding International Application No. PCT/JP2011/067025, Nov. 8, 2011.
Written Opinion for corresponding International Application No. PCT/JP2011/067025, Nov. 8, 2011.

* cited by examiner

*Primary Examiner* — Jianchun Qin
(74) *Attorney, Agent, or Firm* — Ditthavong Mori & Steiner, P.C.

(57) ABSTRACT

An effector affixing device affixes an acoustic effector on a plate material. The effector affixing device includes an effector affixing base and a separation member. The effector affixing base is provided with an effector affixing component. The separation member includes supports erected below the vicinities of four corners of the effector affixing base. The effector affixing base and the separation member are separably coupled with each other. The effector affixing base includes a bottom plate and an effector holding piece. The bottom plate supports the effector. The effector holding piece is erected from an edge portion of the bottom plate. The effector affixing device includes a separation space having a height that at least allows shield lines to intersect with each other below the bottom plate in a state that the effector affixing base is coupled with upper portions of the supports.

20 Claims, 21 Drawing Sheets

(A)

(B)

(C)

EFFECTOR AFFIXING DEVICE

TECHNICAL FIELD

The present invention relates to an effector affixing device that facilitates an operation of an acoustic effector. In more detail, the present invention relates to an effector affixing device that facilitates replacement of an effector, prevents a shield line and others protruding from the effector from obstructing a switching operation, and avoids failures in operation of the effector.

BACKGROUND ART

There is a musical instrument such as an electric guitar that is played in an arbitrary volume by changing sound generated by a sound source into an electrical signal. In an electric guitar or the like, a musical instrument itself and an amplifier are subjected to sound quality adjustment through an acoustic effector that produces various acoustic effects. As the effector, there are a single-function effector and a multi-effector having a plurality of effect functions implemented as one. In the multi-effector, a plurality of types of acoustic effects are stored, and any one of the effects can be selected.

Further, as the single-function effector, there are a plurality of types of effectors, e.g., an equalizer that executes processing such as enhancing or attenuating a specific frequency or an enhancer that distorts a fundamental tone to produce an overtone and mixes this tone into actual sound, and acoustic effects vary depending on an order of connecting these effectors. Therefore, a performer changes the connection of the plurality of effectors in a concert hall and carries out, e.g., changing over a switch by his/her foot during performance so that desired acoustic effects can be obtained.

In order to exert the acoustic effect required by a performer in a concert hall, specifically, a preset adjusted state may need to be changed depending on a situation, e.g., echo performance of sound in the concert hall, a state of an audience in the concert hall, balance with other musical instruments, a condition of the performer himself/herself, a change in supply voltage to the effector according to circumstances, and others. In such a case, since it is not easy to change to sound quality desired by the performer in the multi-effector in which an acoustic state is preset, there are many performers who rearrange and adjust the order of a plurality of continuous single-function effectors and control the acoustic effects at a time of performance.

There are some effectors each comprising a dial switch configured to preset performance sound quality and a wah pedal switch that is disposed to a top portion of a housing like an accelerator pedal of a vehicle and operated by a toe to, e.g., change an amplifying frequency band. This type of effector is configured to be connected to any other effector through a shield line and aligned on a tabular effector board in the performer's desired order.

However, as described above, the connection order of the effectors must be changed at a time of performance. To cope with this change, each effector is affixed on the effector board using, e.g., a hook-and-loop fastener or a double sided tape in the conventional examples. However, since the effector affixed on the effector board in advance comes off during transportation in some cases, Patent Document 1 suggests an affixing base that allows the effector to be fitted in a resin frame having pushing claws formed thereto and to be held in the frame using elastic force of the pushing claws.

However, in a situation adopting the technology disclosed in Patent Document 1, holding force of the pushing claws is weakened as the base is repeatedly used, an accident that the effector is kicked and comes off at a time of switching using a toe or a shield line catches a toe to remove the effector is apt to occur, an operation of the effector is not easy, and a switching operation may be possibly erroneously performed to disable performance. Furthermore, at a time of replacing the effector, the shield line must be accommodated so that it does not obstruct performance when a pedal switch is operated, and there is a problem that replacement of the effector is not easy.

Moreover, a performer selects a predetermined effector from a plurality of effectors based on a color of an effector housing on a stage, operates a wah pedal switch of the effector with his/her toe, and expresses music based on his/her artistic tastes. However, there is a problem that, on a dark stage or a stage in a lighting environment subjected to a dark change by lights-out, selecting a predetermined effector is difficult and an effector operation is not easy.

CITATION LIST

Patent Document

Patent Document 1: Japanese Utility Model Application No. 2005-8610

SUMMARY OF INVENTION

Technical Problem

The present invention relates to an effector affixing device that facilitates an operation of an effector and, more particularly, an object of the present invention is to provide an effector affixing device that facilitates replacement of an acoustic effector, prevents a shield line and others protruding from the effector from interfering with a switching operation, and avoids operation failures of the effector.

Solution to Problem

A first invention according to the present invention provides an effector affixing device that affixes an acoustic effector on a plate material, wherein the effector affixing device comprises: an effector affixing base provided with effector affixing means; a separation member including supports erected below the vicinities of four corners of the effector affixing base, the effector affixing base and the separation member being separably coupled with each other, the effector affixing base comprises: a bottom plate that supports the effector; an effector holding piece erected from an edge portion of the bottom plate, and the effector affixing device comprises a separation space having a height that at least allows shield lines to intersect with each other below the bottom plate in a state that the effector affixing base is coupled with upper portions of the supports.

The effector affixing device having the acoustic effector mounted thereon is affixed to the effector board made of the plate material placed at a feet of a performer. According to the first invention of the present invention, the effector affixing base constituting the effector affixing device can be separated from the separation member, and hence the replacement of the effector can be facilitated. Additionally, when the separation member is replaced with the separation member having a different height, changing an effector installation height can be facilitated. In a state that the plurality of effectors are aligned in the front-rear direction, in an operation for increasing an installation height of the rear effector apart from the performer, reducing an installation height of the front effector close to the performer, and manipulating the rear wah pedal switch, the front wah pedal switch is not erroneously operated. It is to be noted that, in the front-rear relationship, the side close to the performer is the front side and the side apart from the performer is the rear side (this is the same in the following description). Further, since the effector holding piece is formed to be erected from the edge portion of the effector affixing device, each effector can be held on the effector affixing base without being displaced in the horizontal direction. The effector may be directly affixed to the effector affixing base through screws.

Furthermore, the separation space in which the shield lines intersect with each other and inserted between the front and rear supports and the left and right supports is assured below the effector affixing base. Even if the plurality of effectors are installed in the vertical and horizontal directions, inserting the shield lines, power supply line, and others into the separation space enables to prevent the shield line and others from being uplifted and placed above the effectors and also enables to arrange wiring lines on the effector board in the narrow range, whereby the wiring lines, e.g., the shield lines do not become obstacles when a toe is used to perform the switching operation. As a result, the operation of the wah pedal switch of each effector can be facilitated. Moreover, since a shield line socket on the effector side surface is placed away from the effector board, the shield line of an L-shaped terminal plug can be inserted into the effector, a shield line having a linear inserting portion of an I-shaped terminal plug does not have to be used, an end portion of the shield line does not extend to the rear side of each effector, and the effectors can be aligned at narrow intervals.

In the effector affixing device according to the first invention, a second invention of the present invention is characterized in that the bottom plate comprises depressed portions each of which is formed near each corner portion and opened downward and a groove portion that is formed on a front side of the bottom plate and opened upward, the separation member comprises a substantially rectangular base plate that has the supports arranged near four corners thereof, the base plate has a plate body erected on a front edge portion thereof, each depressed portion allows each support to be fitted therein, an inner peripheral wall rear side of the depressed portion on a rear side has a locking jaw, a jaw portion that engages with the locking jaw is provided behind a head portion of each support on the rear side, a head portion of the plate body has a claw portion that engages with the groove portion, and the effector affixing base is coupled with the separation member when the locking jaw of the depressed portion on the rear side engages with the jaw portion of each support on the rear side and the groove portion engages with the claw portion in a state that the supports are fitted in the depressed portions.

According to the second invention of the present invention, in a state that the supports of the separation member are fitted in the depressed portions of the effector affixing base, the locking jaws of the depressed portions on the rear side of the effector affixing base are engaged with the jaw portions on the rear side of the separation member, and the groove portion on the bottom plate upper portion of the effector affixing base is engaged with the claw portion extending from the base plate of the separation member. When the claw portion is unengaged and the front side of the effector affixing base is lifted, each effector can be readily removed together with the effector affixing base and disposed to the separation member at a different position, thereby changing the position. Additionally, when the effector affixing base is disposed to the separation member in such a manner that the jaw portions of the rear supports of the separation member can be caught on the locking jaws of the rear depressed portions of the effector affixing base and then the claw portion is engaged with the groove portion, even if a performer carries out a stepping operation with his/her toe and erroneously gives a kick to the effector, the effector cannot come off the separation member. As a result, changing the position of the effector and replacing the same can be easily carried out in accordance with the performer's request or a situation in a concert hall, and the effector operation can be also facilitated.

In the effector affixing device according to the first invention, a third invention of the present invention is characterized in that the effector affixing base comprises a corner member constituted of the effector holding piece that supports each lower corner portion of the effector from three positions and the bottom plate, and it is divided into four pieces, the effector affixing device comprises corner position adjusting means for enabling to change a position of each corner member in a horizontal direction in such a manner that a dimension of the bottom surface is adapted to the corners of the effector in accordance with each different effector, the corner position adjusting means comprises two pairs of positional adjustment rails which are arranged so as to form a square as seen in a planar view, and the positional adjustment rails slidably connect the respective corner members near corner portions of the square.

According to the third invention of the present invention, the respective divided corner members that affix the four lower corner portions of the effector are slidably connected to the position adjustment rails that extend in two directions, i.e., the horizontal and vertical directions and form respective pairs. When the corner members are slid along the position adjustment rails and positions of the corner members are changed, even though the effectors have different bottom surface dimensions, the effector affixing device associated with these dimensions can be provided. Further, even if the effector has a trapezoidal bottom surface shape, it is possible to cope with this shape by changing the lengths of the position adjustment rails.

In the effector affixing device according to each of the first to third inventions, a fourth invention of the present invention is characterized in that each effector holding piece is erected from an edge portion of each corner portion of the bottom plate and divided into two directions at a corner portion thereof, and a buffer member is configured to be fitted between an inner side of each divided effector holding piece and an outer side of a side surface of the effector.

According to the fourth invention of the present invention, each corner is divided into two directions, i.e., a long-side direction and a short-side direction of the effector, the buffer member made of an elastic body, e.g., a rubber ring can be easily fitted on each divided holding piece even in case of replacing to an effector whose bottom surface size is slightly different from that of the effector affixing portion formed of the corner members, and the effector can be affixed without backlash of the effector affixing base.

In the effector affixing device according to each of the first to fourth inventions, a fifth invention of the present invention is characterized in that the effector affixing means comprises at least a pair of protrusions which are formed at both side edge portions of the effector affixing base so as to protrude downward, and a binder which abuts on an upper side and a lateral side of the effector mounted on the effector affixing base and holds the effector is configured to be attached to the protrusion by engagement.

The effector may be affixed to the effector affixing base using, e.g., screws or an adhesive tape. However, according to the fifth invention of the present invention, since the pair of protrusions protruding downward below both the side edge portions are provided, a rubber band or a hair accessory called scrunchy can be wound around the pair of protrusions from above the effector in a state that the effector is mounted on the effector affixing base, thereby affixing the effector. As a result, the effector and the effector affixing base can be readily affixed or detached.

In the effector affixing device according to each of the first to fifth inventions, a sixth invention of the present invention is characterized in that the front supports and the rear supports coupled with the effector affixing base have different heights, and the plate material and the bottom surface of the effector affixing base are coupled at a distance so as to tilt in a front-rear direction.

According to the sixth invention of the present invention, since the front supports and the rear supports have different heights, the plate material of the effector board and the bottom surface of the effector affixing base are affixed so as to be tilted in the front-rear direction. As a result, the performance operation can be carried out while tilting the effector as the performer desires, and hence the operation of the wah pedal switch can be further facilitated.

In the effector affixing device according to each of the first to sixth inventions, a seventh invention of the present invention is characterized in that the effector affixing device comprises a front tongue portion which bends and is upwardly concave on the front side thereof and also comprises lighting means for reflecting light on the front tongue portion and lighting a housing front surface of the effector with the light.

At a time of giving a performance on the stage, a dark change may be carried out on the stage to enhance a stage illumination effect. In such a case, according to the seventh invention, even on the stage where the dark change is carried out, the front surface of the housing of the effector cannot be seen from the audience side in the concert hall by the lighting means, a performer can readily identify colors of the effector housing and a decorative string without interfering with the performance effect, and hence a different effector is not erroneously operated at the time of performance.

Advantageous Effects of Invention

According to the first invention, the replacement of the effector can be facilitated. Further, the effector installation height can be easily changed. Since the shield lines and others can be accommodated in the separation space below the effector affixing base, and hence the wiring lines, e.g., the shield lines do not interfere with the switching operation using a toe. Even in case of arranging the effectors in two rows in the front-rear direction, since the rear effector can be placed at a higher position, the switch of the front effector is not operated by mistake at a time of operating the wah pedal switch of the rear effector.

According to the second invention, the positional change or the replacement of the effector can be easily carried out in accordance with a request of the performer or a situation in the concert hall, and the effector operation can be also facilitated.

According to the third invention, even if each effector has a different bottom surface dimension, the effector affixing device associated with this dimension can be provided. Furthermore, even if the effector has a trapezoidal bottom surface shape, it is possible to cope with this shape by changing the lengths of the position adjustment rails.

According to the fourth invention, even in case of replacing to the effector having a bottom surface dimension slightly different from a bottom surface dimension of the effector affixing portion formed of each corner member, the effector can be affixed without backlash of the effector affixing base, and the replacement of the effector can be facilitated.

According to the fifth invention, the effector and the effector affixing base can be readily affixed or taken off.

According to the sixth invention, since the performance operation can be carried out so as to tilt the effector as the performer desires, the operation of the wah switch can be further facilitated.

According to the seventh invention, since a color of the effector housing or a decorative string can be easily identified even on the stage where the dark change is carried out without disturbing the performance effect, a different effector is not erroneously operated at the time of performance.

DESCRIPTION OF EMBODIMENTS (Embodiment 1)

Figure 1:
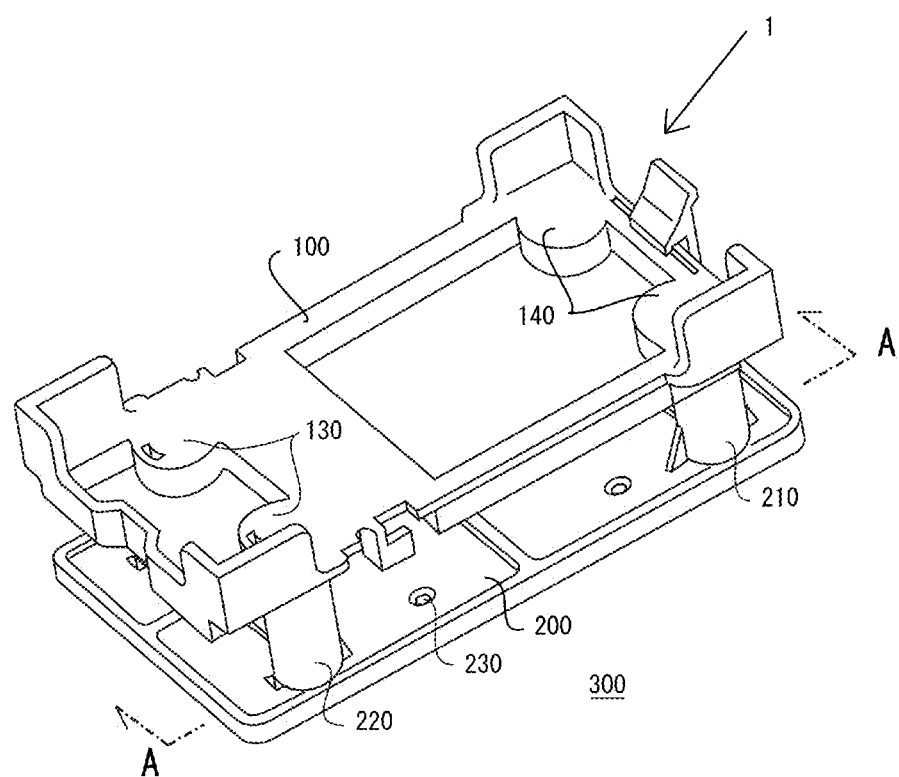
FIG. 1 is a perspective view of an effector affixing device (Embodiment 1)
Figure 2:
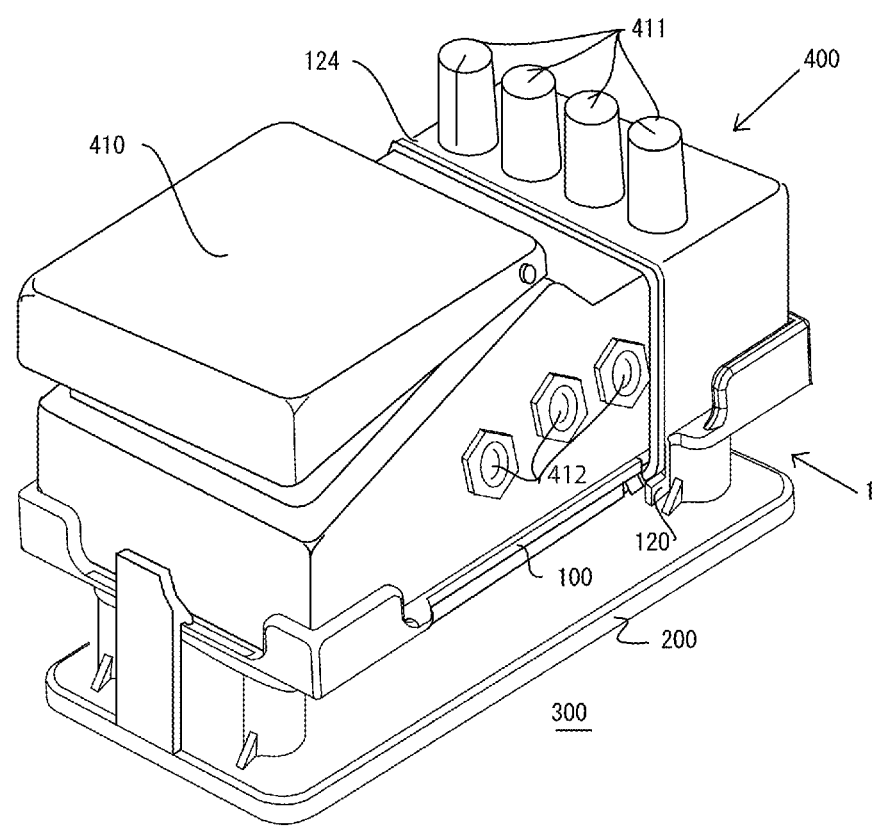
FIG. 2 is a perspective view of the effector affixing device with an effector including a wah pedal being affixed (Embodiment 1)
Figure 3:
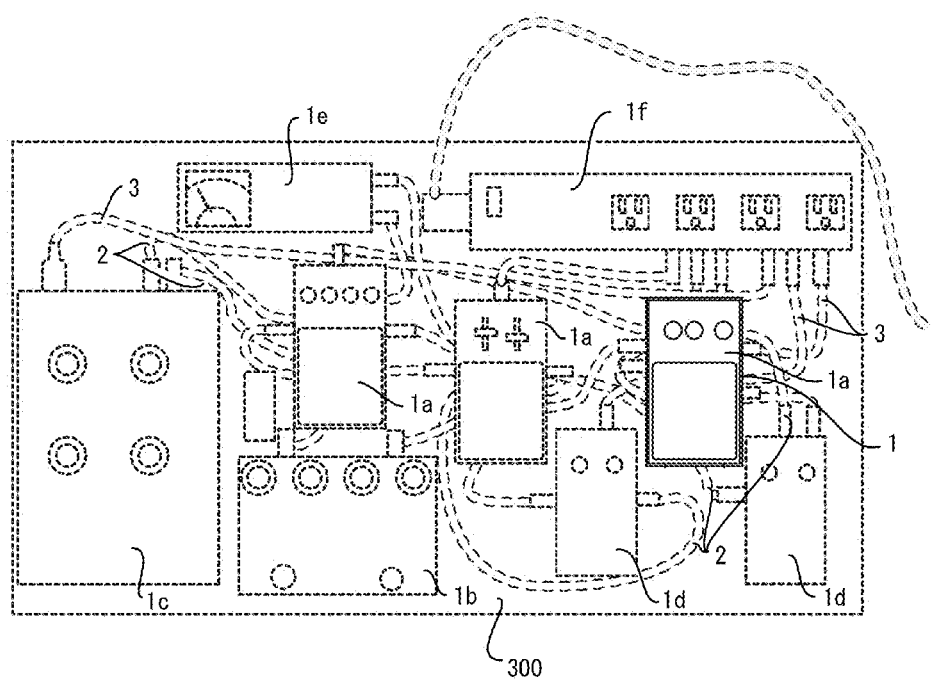
FIG. 3 is an explanatory view of a state that the effector is arranged on an effector board (Embodiment 1)
Figure 4:
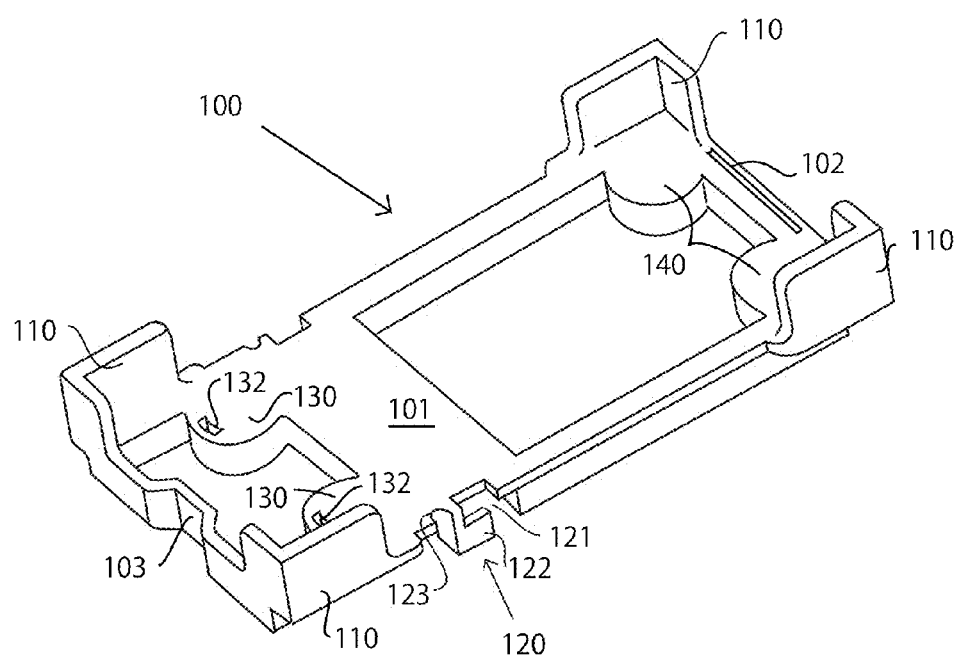
FIG. 4 is a perspective view of an effector affixing base (Embodiment 1)
Figure 5:
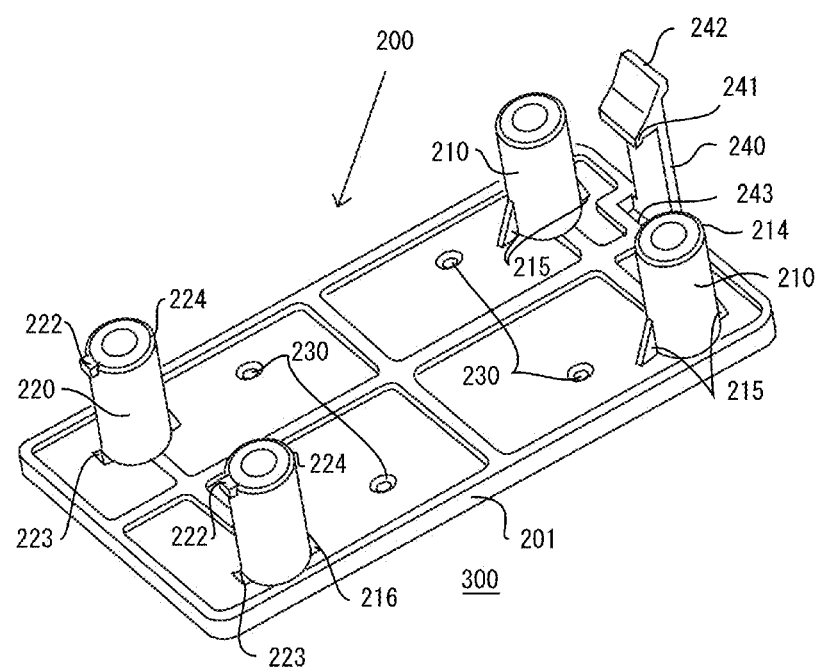
FIG. 5 is a perspective view of a separation member (Embodiment 1)
Figure 6:
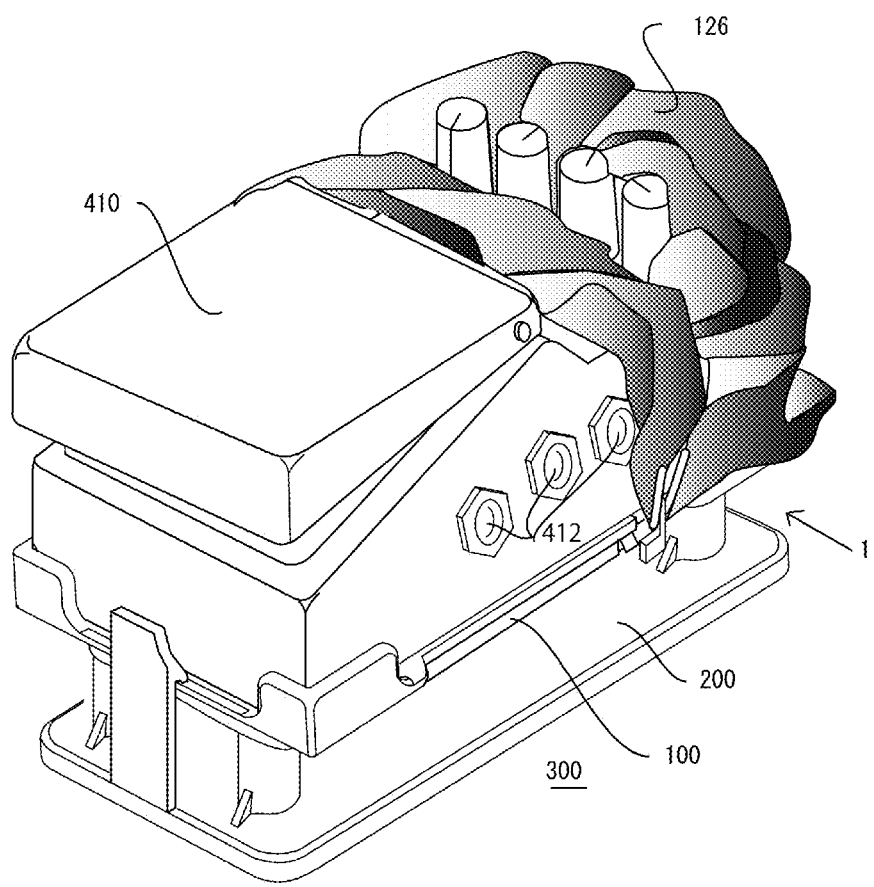
FIG. 6 is an explanatory view of a state that a decorative string is disposed to protrusions (Embodiment 1)
Figure 7:
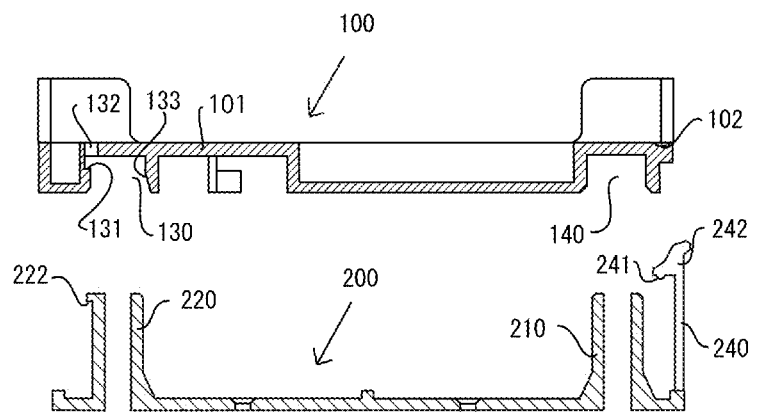
FIG. 7 is a cross-sectional view (Embodiment 1)
Figure 7:
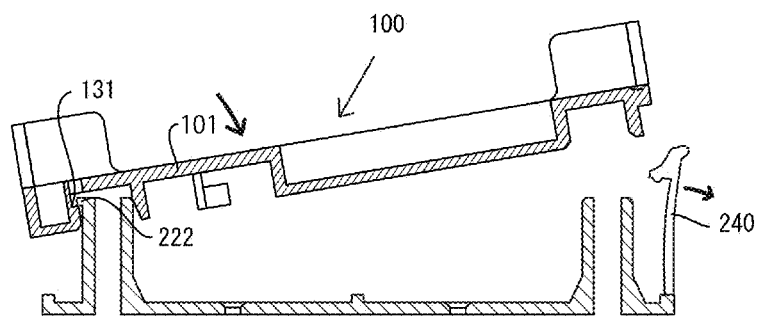
Figure 7:
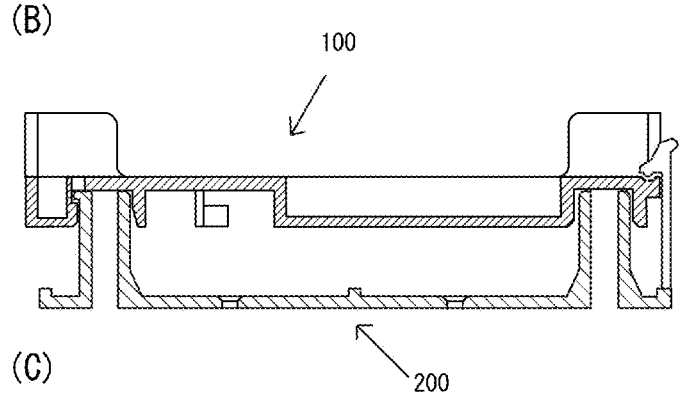

Embodiment 1 according to the present invention will now be described hereinafter with reference to FIG. 1 to FIG. 7. FIG. 1 is a perspective view of an effector affixing device, FIG. 2 is a perspective view of the effector affixing device in a state that an effector comprising a wah pedal is affixed, FIG. 3 is an explanatory view of a state that the effector is arranged on an effector board, FIG. 4 is a perspective view of an effector affixing base, FIG. 5 is a perspective view of a separation member, FIG. 6 is an explanatory view of a state that a decorative string is disposed to protrusions, and FIG. 7 is cross-sectional views taken along a position A-A in FIG. 1.

An outline of a configuration of an effector affixing device will now be described with reference to FIG. 1. In an effector affixing device 1 according to Embodiment 1, supports 210 and 220 formed on a separation member 200 are fitted in and coupled with depressed portions 130 and 140 formed in an effector affixing base 100. Further, a separation space in which at least shield lines 2 can be arranged so as to intersect with each other is formed between the effector affixing base 100 and the separation member 200 (see FIG. 3). The effector affixing base 100 can be separated by pulling and removing the supports 210 and 220 from the depressed portions 130 and 140. Furthermore, the effector affixing device 1 is screwed and fixed to an effector board 300, which is formed of a plate material, by using non-illustrated screws via holes 230 formed in the separation member 200.

An example of a state that an effector 400 is mounted on and affixed to the effector affixing device 1 will now be described with reference to FIG. 2. The effector is mounted on the effector affixing base 100 and affixed to the effector board 300, which is formed of a plate material, through the separation member 200. Further, the effector is affixed by holding both sides and an upper side thereof using a banding band 124 that is caught on protrusions 120 formed so as to protrude downward from both edges of the effector affixing base 100. A plurality of shield line sockets 412 are provided on side surfaces of a housing of the effector, and non-illustrated shield line plugs are inserted into these sockets so that the effector is connected to other effectors. Furthermore, dial switches 411 and a wah pedal switch 410 operated using a toe are formed on the upper surface of the effector.

An example of an installation state of each effector on the effector board will now be described with reference to FIG. 3. Effectors (1*a*) each having a wah pedal switch formed thereto, other acoustic devices (1*b*), (1*c*), and (1*d*), and a level meter (1*e*) are connected to the effector board 300 through the shield lines 2, and they are connected to a power supply device (1*f*) via power supply cords 3. Since various kinds of devices are arranged in a space that allows a performer to use one foot for operations in this manner, each effector (1*a*) having the wah pedal switch formed thereto is arranged at a position near the acoustic devices (1*b*), (1*c*), and (1*d*) each having switches for adjusting acoustic effects formed thereon. Moreover, in conventional examples, a shield line having a length conforming to a predetermined standard connects each acoustic device, and its extra length portion is folded and accommodated between an acoustic device and an adjacently arranged acoustic device.

FIG. 3 shows a state that an extra length portion of the shield line or the like is accommodated in the separation space between the effector affixing base 100 and the separation member 200 by applying the present invention. Here, it is preferable for a diameter of the shield line to be approximately 3 mm to approximately 10 mm and for a height that enables the shield lines to intersect with each other to be 10 mm to 20 mm. If this height is set to 15 mm, a thin shield line and a thick shield line can be arranged so as to intersect with each other. The height that enables the shield lines to intersect is selected in accordance with each shield line. This can be likewise applied to the following embodiments.

The effector affixing base according to Embodiment 1 will now be described in detail with reference to FIG. 4. The effector affixing base 100 has a substantially rectangular shape, and it includes a bottom plate 101 adapted to a size of an effector bottom surface, effector holding pieces 110 erected from four corner portions, a pair of protrusions 120 that are formed at substantially central positions at both side edges portions of the bottom plate and protrude downward, a groove portion 102 that is formed on a front side (an upper right side in the drawing) of the bottom plate and concave upward, and depressed portions 130 and 140 that are formed near the respective corner portions of the bottom plate, opened on the lower side, and have a substantially cylindrical shape. A type of a material of the effector affixing base is not restricted as long as it is a flexible resin material.

Each effector holding piece 110 is upwardly erected so as to surround each of the four corner portions of the bottom plate 101 from front, rear, left, and right directions in such a manner that the effector 400 is not displaced in the horizontal direction. A concave portion 103 that is inwardly dented is formed at a central position of the bottom plate on the rear side (an upper left side in the drawing). As a result, in a state that a plug bent portion of each shield line plug of a non-illustrated L-type connection terminal faces the lower side, the plug can be inserted into each shield line socket of the effector.

Additionally, the pair of protrusions 120 are formed so as to protrude downward from both the left and right side edge portions of the bottom plate 101. In Embodiment 1, each protrusion 120 has a substantially L-like shape as seen from the bottom surface, and it is constituted of a portion 122 that is parallel to the side edge direction below the side edge and a portion that extends toward the bottom plate from the end portion. A part between the portion 122 that is parallel to the side edge direction and the edge portion of the bottom plate 101 is opened, one end of the portion 122 functions as an open end, and an insertion hole 121 opened to the upper side and the lateral side is formed.

Further, each notch portion 123 having a semicircular shape is formed at a position of the edge portion of the bottom plate 101 on the opposite side so as to sandwich the protrusion 120. This notch portion 123 serves as a position where a string-like portion, e.g., a rubber band is accommodated when affixing the effector to the effector affixing base using the rubber band or the scrunchy. Both ends of the rubber band or the like are caught on the protrusions 120, and the string-like portion is accommodated in the notch portions 123 and the insertion holes 121 so that the effector can be held without protruding from the effector affixing base toward the lateral sides. As a result, when the effector does not have to be firmly affixed, the effector can be very easily affixed. Further, when the effector is firmly affixed using the banding band and a shape or color of a decorative string 126, e.g., the scrunchy caught on the protrusions as a clue to the identification of each effector is changed, a performer can readily discriminate the effector as an operation target from other effectors (see FIG. 6).

Furthermore, the groove portion 102 that is concave on the upper side is formed in the upper part of the front edge portion of the bottom plate 101. In a head portion of a plate body 240 erected at a front end portion of a base plate, an end of a claw portion 241 formed toward the inner side is engaged with the groove portion 102 (see FIG. 1 and FIG. 5). The depressed portions 130 and 140 that are concave toward the lower side and have a short cylindrical shape are formed on the inner lower side near the four corner portions of the bottom plate 101. A locking jaw 131 is formed on an inner peripheral wall rear side of the depressed portion 130 on the rear side, and an inner peripheral wall front side 133 is formed at a slant so as to widen an open end (see FIG. 7). Moreover, a hole 132 is formed in the bottom plate 101 within the range where the locking jaw 131 is formed.

Then, the separation member 200 according to Embodiment 1 will now be described with reference to FIG. 5. The separation member 200 is constituted of a substantially rectangular base plate 201 that is affixed to the effector board 300, supports 210 and 220 erected to face each other at the positions below the depressed portions 130 and 140 formed on the effector affixing base near the corner portions of the base plate, the plate body 240 erected from the front edge portion of the base plate 201, and holes 230 that enable to mount on the effector board 300 using screws. As a material of the base, like the effector affixing base, a flexible resin material can be used.

Each support erected upward from the base plate 201 has a substantially cylindrical shape and, a height of all the supports, a height of the separation space between the effector affixing base 100 and the separation member 20 is set to 20 mm which is a height that enables the thick shield lines to intersect with each other. Each of the front supports 210 is constituted of a support formed by narrowing a support head portion 214, and a reinforcing rib 215 is formed in the front-rear direction of a leg portion of this support. Each of the rear supports 220 is constituted of a support formed by narrowing a support head portion 224, a jaw portion 222 is formed on the rear side of this head portion, a hole 4 having a shape associated with a planar shape of the jaw portion is formed in the base plate 201 at a position below the jaw portion 222, and a reinforcing rib 216 is formed on the front side of a leg portion of each rear support 220.

Moreover, the flexible plate body 240 is erected on the front edge portion of the base plate 201. The claw portion 241 that engages with the groove portion 102 in the effector affixing base is formed on the inner side below the head portion of the plate body 240, and a finger placing portion 242 is formed on the outer side of this claw portion 241. Since the plate body is made of a flexible material, when force is applied outward to the finger placing portion 242 and the fiber placing portion 242 is bent, the groove portion 102 and the claw portion 241 can be disengaged.

A hole 243 having a shape associated with the planar shape of the claw portion 241 is formed in the base plate 201 within the range below a position at which the claw portion 241 is formed, and a hole 223 having a shape associated with the planar shape of each jaw portion 222 is formed in the base plate within the range below the jaw portion 222. As a result, the separation member 200 having the jaw portions 222 and the claw portion 241 can be removed in the vertical direction from a molding die, and it can be molded in one process.

Here, a coupling operation of the effector affixing base 100 and the separation member 200 will now be described with reference to FIG. 7. FIG. 7 is cross-sectional views taken along a position A-A in FIG. 1. FIG. 7 (A) shows a state that the effector affixing base 100 is separated from the separation member 200 in the vertical direction, FIG. 7 (B) shows a state of a process for coupling the effector affixing base 100 with the separation member 200, and FIG. 7 (C) shows a state that the effector affixing base 100 is coupled with the separation member 200.

First, to dispose the effector affixing base 100 to the separation member 200, in a state that the front side (an upper right side in the drawing) of the effector affixing base is raised and the bottom plate 101 is tilted in the front-rear direction, the depressed portions 130 on the rear side (an upper left side in the drawing) of the effector affixing base 100 are arranged to abut on the head portions of the pair of rear supports 220 formed on the base plate 100. Additionally, the locking jaws 131 of the rear depressed portions 130 are meshed with the jaw portions 222 formed on the rear sides of the rear supports 220, and then the front side of the effector affixing base is lowered. Subsequently, the depressed portions 140 on the front side of the effector affixing base are fitted on the head portions of the pair of front supports 210 of the separation member 200 while warping the head portion of the plate body 240 of the base toward the outside, the effector affixing base 100 is horizontalized, the head portion of the plate body 240 is returned to its original position, the claw portion 241 is fitted in the groove portion 102 formed in the front edge portion of the bottom plate of the effector affixing base, and the effector affixing base 100 is coupled with the separation member 200.

To detach the coupled effector affixing base 100 from the separation member 200, the plate portion 240 is warped toward the outside, the claw portion 241 is removed from the groove portion 102, the front side of the effector affixing base 100 is tilted so as to be uplifted with the head portions of the rear supports 220 being used as an axis, the locking jaws 131 are disengaged from the jaw portions 222, and the effector affixing base 100 is removed from the separation member 200. As a result, the effector affixing base can be readily separated from the base with small resistance.

Here, a procedure of affixing the effector using the banding band will now be described (see FIG. 4). First, the banding band 124 having bulge portions 125 formed at both end portions (see FIG. 8) is inserted into respective opened side portions of the insertion holes 121 from the lateral sides of the insertion holes with one bulge portion 125 facing the downward direction. Additionally, the bulge portions 125 are displaced to the opened upper portions of the insertion holes 121. In this manner, the bulge portions of the banding band 124 are caught on the portions of the portions parallel to the side edge direction and the edge portion of the bottom plate so that the banding band 124 cannot be removed, and one end portion of the banding band 124 is held in this state.

Then, the banding band extending upward is rotated so as to surround and hold the left and right side portions and the upper portion of the effector, and the bulge portion at the other end of the banding band is inserted from the lateral side of the other insertion hole of the effector affixing base. Additionally, the bulge portion is displaced to the portion that is opened on the upper side, and the banding band 124 is fixed. Since the banding band made of a resin has poor stretch properties, the effector can be firmly affixed to the effector affixing base. To remove the effector from the effector affixing base, the bulge portion of the banding band on one side can be first displaced to the insertion hole and removed, and then the other banding band can be likewise removed. In Embodiment 1, although the banding band has been described as a banding instrument, a rubber band, a decorative string, or the like can substitute for the banding band.

(Embodiment 2)

Figure 8:
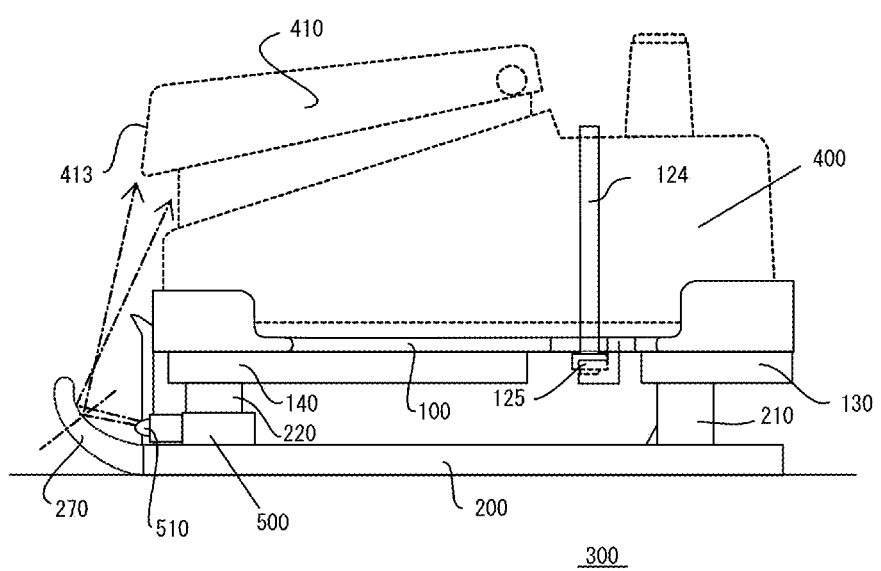
FIG. 8 is an explanatory view of an effector affixing device comprising a front tongue portion and lighting means (Embodiment 2)

Embodiment 2 will now be described with reference to FIG. 8. In Embodiment 2, on the front side of the separation member 200 according to Embodiment 1, a front tongue portion 270 is extended so as to be concave upward, and a lighting device that causes reflection on the front tongue portion 270 and illuminates a front face of an effector 400 is provided. The lighting device is formed integrally with a light-emitting diode 510 and a power supply mechanism 500 which includes a power supply and a switch. The lighting device is disposed in a separation space between an effector affixing base 100 and the separation member 200 with a light-emitting side of the lighting-emitting diode 510 being provided on the front tongue portion 270 side. Further, light emitted from the light-emitting diode 510 is reflected on the front tongue portion 270 and applied to front faces 413 of an effector housing and a wah pedal. As a result, even if stage illumination is put out and a stage is subjected to a dark change, a performer can carry out a switch operation using his/her toe with a clue of a color of the wah pedal illuminated with the light from the light-emitting diode.

A curvature of the front tongue portion that is formed so as to be concave upward is set to a curvature that allows the light applied toward the front side from the light-emitting diode to be reflected and applied to the front side and a nearby position of the effector housing and the wah pedal. Furthermore, the light emitting from the light-emitting diode is colorless light, and an upper face of the front tongue portion is white. As a result, the effector housing is illuminated in such a manner that the housing can be easily recognized by the performer but indistinctive from the audience. It is to be noted that the light-emitting portion of the light-emitting diode may be arranged so as to protrude from a front face of the effector affixing base.

(Embodiment 3)

Figure 9:
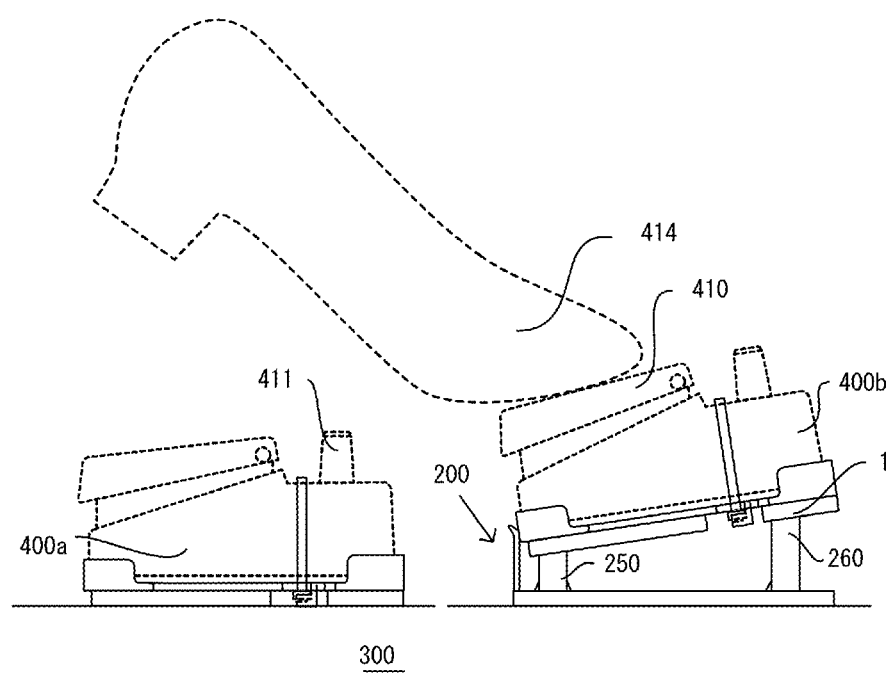
FIG. 9 is a side elevation of a state where a plurality of effectors are arranged in a front-rear direction (Embodiment 3)

Embodiment 3 will now be described with reference to FIG. 9. In regard to a separation member 200 according to Embodiment 3, front and rear supports 250 and 260 have different heights. In Embodiment 3, configurations of the front and rear supports are the same except that these supports have different heights from those of the supports according to Embodiment 1, a configuration of an effector affixing base is the same as that according to Embodiment 1, and hence a description thereof will be omitted. It is possible to select the front or rear supports as a target of increase in height in accordance with a performer's request.

Moreover, a height of a separation space between the effector affixing base 100 on the support side with a small height arranged on the front or rear side and a separation member 200 is a height that enables shield lines to intersect with each other, and the height of the lower supports on the front side is set to 20 mm in Embodiment 3. Additionally, a configuration of the effector affixing base, a coupling operation of the effector affixing base and the separation member, affixing and removing operations of an effector using a banding band, and protrusions for catching a decorative string are equal to those in Embodiment 1, and hence a description therefore will be omitted.

Further, when a rear effector (400b) is affixed to an effector affixing device 1 with respect to a front effector (400a) directly affixed to an effector board 300, the rear effector (400b) can be placed at a high position, and a rear wah pedal switch 410 can be operated with a toe 414 without being obstructed by a dial switch 411 or the like of the front effector even though the rear effector (400b) has the wah pedal switch 410.

(Embodiment 4)

Figure 10:
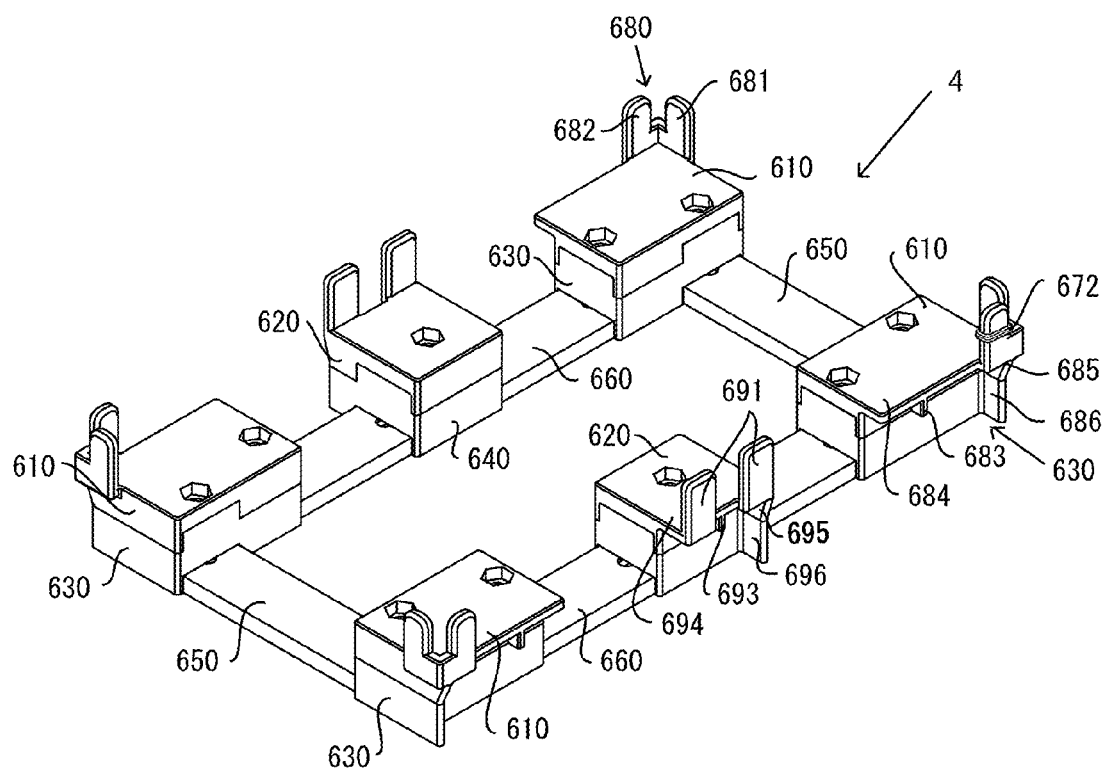
FIG. 10 is a perspective view of an effector affixing device (Embodiment 4)
Figure 11:
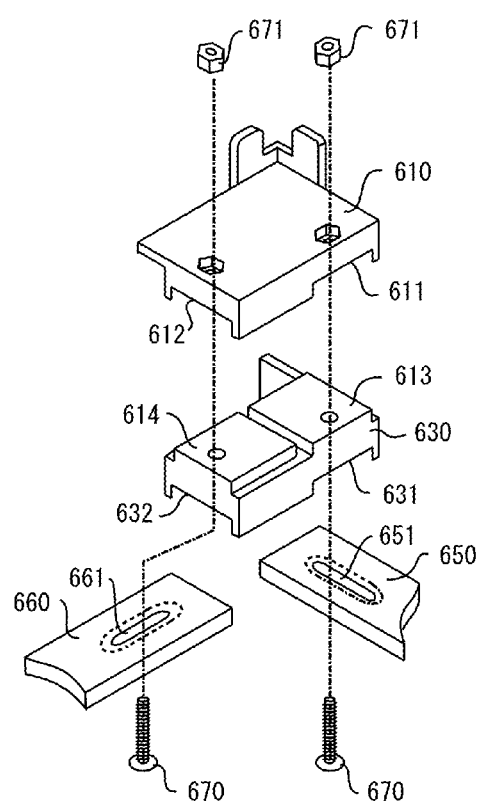
FIG. 11 is an explanatory view of a configuration for a corner portion of the effector affixing device (Embodiment 4)
Figure 12:
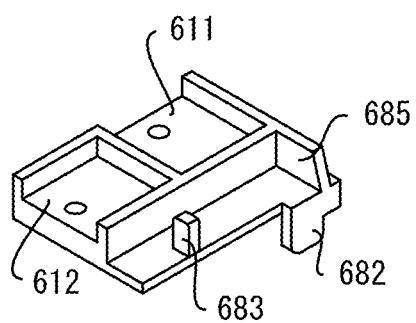
FIG. 12 is a perspective view showing a corner member from the lower side (Embodiment 4)
Figure 13:
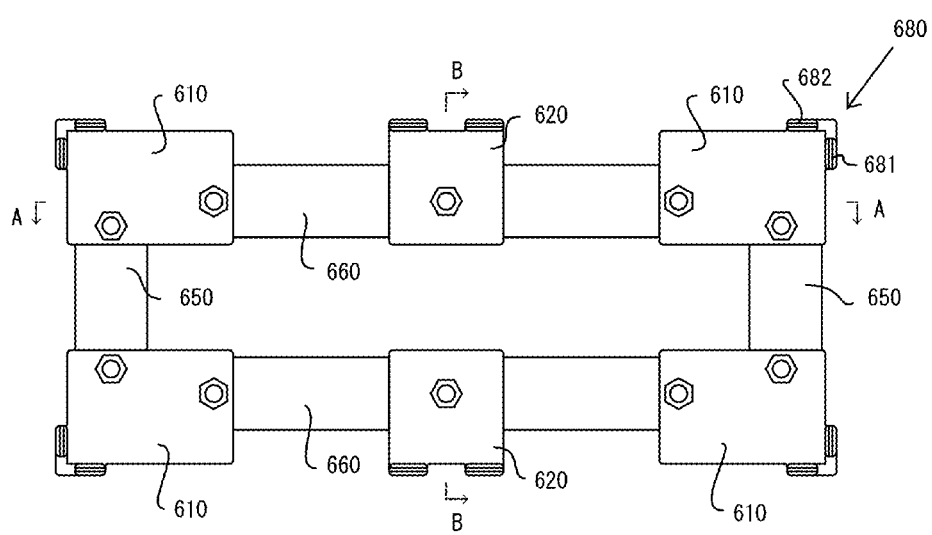
FIG. 13 is a plan view (Embodiment 4)
Figure 14:
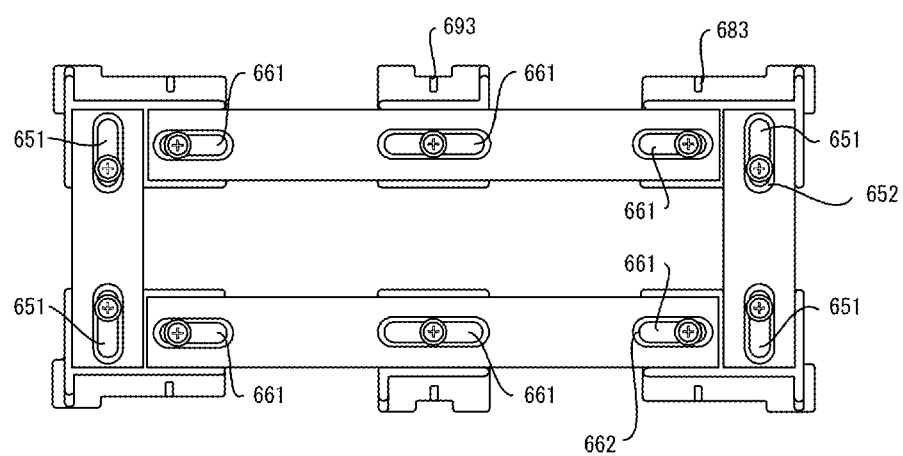
FIG. 14 is a bottom view (Embodiment 4)
Figure 15:
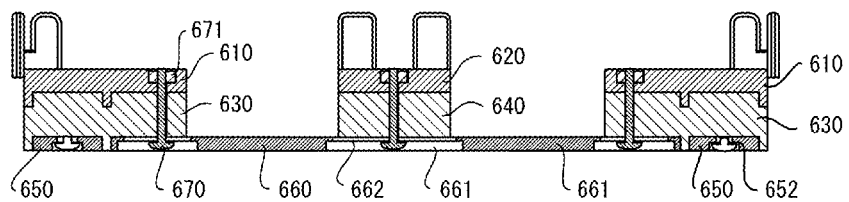
FIG. 15 is a cross-sectional view (Embodiment 4)
Figure 16:
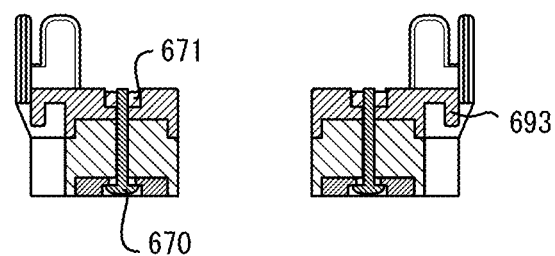
FIG. 16 is a cross-sectional view (Embodiment 4)

Embodiment 4 according to the present invention will now be described with reference to FIG. 10 to FIG. 16. FIG. 10 is a perspective view of an effector affixing device 4 according to Embodiment 4, FIG. 11 is an explanatory view of a configuration of a corner portion of the effector affixing device, FIG. 12 is a perspective view showing a corner member from the lower side, FIG. 13 is a plan view, FIG. 14 is a bottom view, FIG. 15 is a cross-sectional view taken along a position A-A in FIG. 13, and FIG. 16 is a cross-sectional view taken along a position B-B in FIG. 13. In the effector affixing device 4 according to Embodiment 4, an effector affixing base is divided into corner members 610 configured to affix four lower corner portions of an effector and two side edge members 620 configured to affix side edges of the effectors. Separation members 630 and 640 are disposed to the lower sides of the corner members 610 and the side edge members 620 in accordance with respective members. An elongated positional adjustment rail 660 is disposed to the lower side of each separation member 630 below each corner member 610 along the longitudinal direction of each effector, and a shorter positional adjustment rail 650 is disposed along a short side direction of each effector.

Each effector whose bottom surface has a vertical dimension of approximately 90 to approximately 180 mm and a horizontal dimension of approximately 40 mm to approximately 150 mm is circulated, and many kinds of effectors are circulated. In Embodiment 4, each of the positional adjustment rails 650 and 660 has a rectangular cross-sectional shape so as to be adapted to bottom surfaces of effectors having different sizes, and the rails are selected from those having a plurality of types of lengths. The shorter positional adjustment rail 650 is used in the short side direction of each effector, and the elongated positional adjustment rail 660 is used in the long side direction of each effector. Slotted holes 651 for screw insertion are formed in the shorter positional adjustment rail 650 in the vicinity of both ends thereof (see FIG. 14). Slotted holes 661 for screw insertion are formed in the elongated positional adjustment rail 660 in the vicinity of both ends thereof and at a substantially central part. The elongated positional adjustment rail and the shorter positional adjustment rail are arranged to form a substantially rectangular shaped as seen in a plane. Step portions 652 and 662 are formed at the slotted holes of the positional adjustment rail, a head portion of each screw 670 is caught (FIG. 15 and FIG. 16), and it is possible to cope with an effector having a different bottom surface size by sliding positions of the corner members or the side edge members within the range of a length of a diameter of the slotted hole.

Each corner member 610 has a substantially rectangular shape, and concave portions 611 and 612 associated with a cross-sectional dimension of each positional adjustment rail are formed in the short-side direction and the long-side direction on the bottom portion thereof (see FIG. 12). Further, screws 670 inserted into the slotted holes 651 and 661 in the shorter positional adjustment rail 650 and the elongated positional adjustment rail 660 are screwed to nuts 671 embedded in nut embedding holes provided in a top portion of the corner member 610 (see FIG. 11). An effector holding piece 680 erected from the corner portion of each corner member 610 has a notched corner portion, and the effector holding piece 680 is divided into a holding piece 681 in the short-side direction and a holding piece 682 in the long-side direction (see FIG. 10).

In a state that an effector is mounted on the effector holding base, a buffer member formed of an elastic body that fills a gap between the effector and the effector holding pieces 681 and 682, e.g., a rubber ring 672 (see FIG. 10) is fitted on the divided holding pieces 681 and 682, and the effector is thereby affixed without backlash. Furthermore, a protrusion 683 is formed on the lower side of the corner member 610 on the outer edge side in the short-side direction so as to face downward (see FIG. 12). A string-like body such as a rubber band or a scrunchy that holds the upper side and the lateral side of the effector with the effector mounted on the effector affixing base binds the protrusion 683, thereby affixing the effector. An outer edge portion of a bottom plate 684 of the corner member 610 protrudes toward the lateral side, and a reinforcing piece 685 is suspended from the protruding portion in the vicinity of the corner.

Each side edge member 620 has a substantially rectangular shape, and a concave portion associated with the cross-sectional dimension of the positional adjustment rail is formed in the long-side direction on the bottom portion. Furthermore, the screw 670 inserted into the slotted hole 661 of the elongated positional adjustment rail 660 is screwed to the nut 671 embedded in a nut embedding hole provided in the upper portion of the side edge member 620. Each effector holding piece 691 erected from the side edge portion of the side edge member 620 is divided into two pieces in the long-side direction. Moreover, a protrusion 693 is formed on the edge side of the side edge member 620 to protrude downward, and an outer edge portion of a bottom plate 694 protrudes, and a reinforcing piece 695 is formed at an end portion of the protruding portion. These points and functions of these members are equal to those of the corner member.

As the separation members, each corner separation member 630 is disposed below each corner member, and each side edge separation member 640 is disposed below each side edge member. In the top portion of each corner separation member, a convex portion 613 that is fitted in accordance with the shorter positional adjustment rail concave portion 611 of the corner member and a convex portion 614 that is fitted in accordance with the long-side rail concave portion 612 are formed (see FIG. 11). Additionally, in the bottom portion of the corner separation member 630, concave portions 631 and 632 that coincide with shapes of the concave portions 611 and 612 in the bottom portion of the corner member are formed (see FIG. 11 and FIG. 12). Further, each reinforcing piece 686 that supports the lower side of the reinforcing piece 685 of the corner member and reaches to the effector board is provided (see FIG. 10). Furthermore, each corner separation member 630 is arranged between the corner member 610 and the positional adjustment rails 650 and 660, the screws 670 inserted from the lower side of the slotted holes 651 and 661 of the positional adjustment rails are inserted into the screw holes of the separation member 630 and screwed to the nuts 671 embedded in the top portion of the corner member, thereby forming the corner of the effector affixing base (see FIG. 11). Moreover, when the separation member having a desired height is selected from separation members having a plurality of types of heights, the effector affixing base is formed into an affixing base having a height desired by a performer.

In the bottom portion of side edge separation member 640, like the side edge member 620, a concave portion associated with the cross-sectional dimension of the positional adjustment rail is formed along the long-side direction. Further, on the top portion of each side edge separation member, a convex portion that is fitted in the long-side rail concave portion of the side edge member in association with each other is formed. Furthermore, a reinforcing piece 696 that supports the lower side of the reinforcing piece 695 of the side edge member and reaches the effector board is provided. Moreover, the side edge separation member 640 is arranged between the side edge member 620 and the elongated positional adjustment rail 660, and a screw inserted from the lower side of the slotted hole of the elongated positional adjustment rail is inserted into a screw hole of the side edge separation member 640, and screwed to a nut embedded in the top portion of the side edge member, thereby forming a side edge support portion of the effector affixing base. Additionally, when each side edge separation member 640 having the same height as each corner separation member 630 is selected, the effector affixing base is formed as an affixing base having a height desired by a performer. Further, the effector affixing device according to this embodiment can be likewise adapted to an effector having, e.g., a trapezoidal shape according to a footprint by forming the shorter positional adjustment rail to be long on the rear side and short on the front side. As a result, many various kinds of effectors can be affixed.

In the effector affixing device 4 according to this embodiment, each corner member 610 is arranged to overlap each corner separation member 630, each side edge member 620 is arranged to overlap each side edge separation member 640, and the elongated positional adjustment rail 660 and the shorter positional adjustment rail 650 connect the lower sides of these members and are arranged to form a substantially square plane. Further, a position of the effector holding piece 680 at each corner portion of the corner member 610 is substantially matched with a size of the bottom surface of the effector to be mounted, and the screws 670 are inserted from the lower side into the screw holes 651 and 661 provided in the member and then screwed, thereby temporarily affixing the effector. Then, the positions of each corner member 610 and each side edge member 620 are adjusted so that the size of the bottom surface of the effector affixing base coincides with the size of the bottom surface of the effector, and the screws 670 freely fitted in the slotted holes 651 and 661 of the positional adjustment rails 650 and 660 are fastened, and the effector affixing device is thereby assembled.

Moreover, in case of affixing an effector having a bottom surface whose size is slightly smaller than a size of the bottom surface of assembled effector affixing base, the rubber ring 672 can be disposed to the divided holding pieces 681 and 682, and a gap between the effector and the effector affixing base is filled, whereby backlash is avoided. As a result, even in case of disposing and affixing an effector having a bottom surface whose size is slightly smaller to the previously assembled effector affixing device 4, it is not necessary to adjust positions of the effector and the effector affixing base by using a buffer member, e.g., the rubber ring 672 and again assemble the effector. As a result, there may be obtained an advantageous effect that the rapid replacement of the effector can be facilitated even in a concert hall. It is to be noted that a material having elasticity can suffice as the buffer member, and a material and a shape are not restricted. For example, if a hole is formed in the top portion of the holding piece, the buffer member may be formed into a shape having a shaft portion on the lower side and a bulge portion on the effector side, the shaft portion may be inserted into the hole, and the bulge portion may be arranged to abut on the effector, thereby avoiding the backlash.

The assembled effector affixing device may be easily affixed on the effector board using a hook-and-loop fastener or a double sided tape, or it may be firmly affixed by screwing and the like. Furthermore, in a state that the effector is affixed, a space with a height that allows shield lines to intersect with each other is assured between the effector bottom surface and the coupling rails 650 and 660. In regard to the affixing device according to Embodiment 4, its members are overlapped and configured, and then the accurate and stable effector affixing device is assembled in accordance with a size of the effector bottom portion. Further, when the buffer member, e.g., the rubber ring 672 is fitted in the divided erected pieces 681 and 682, even an effector having a slightly different bottom surface size can be mounted without backlash. Furthermore, adjusting the positions of the screws in the slotted holes of the positional adjustment rails enables to affix many various effectors having different sizes.

(Embodiment 5)

Figure 17:
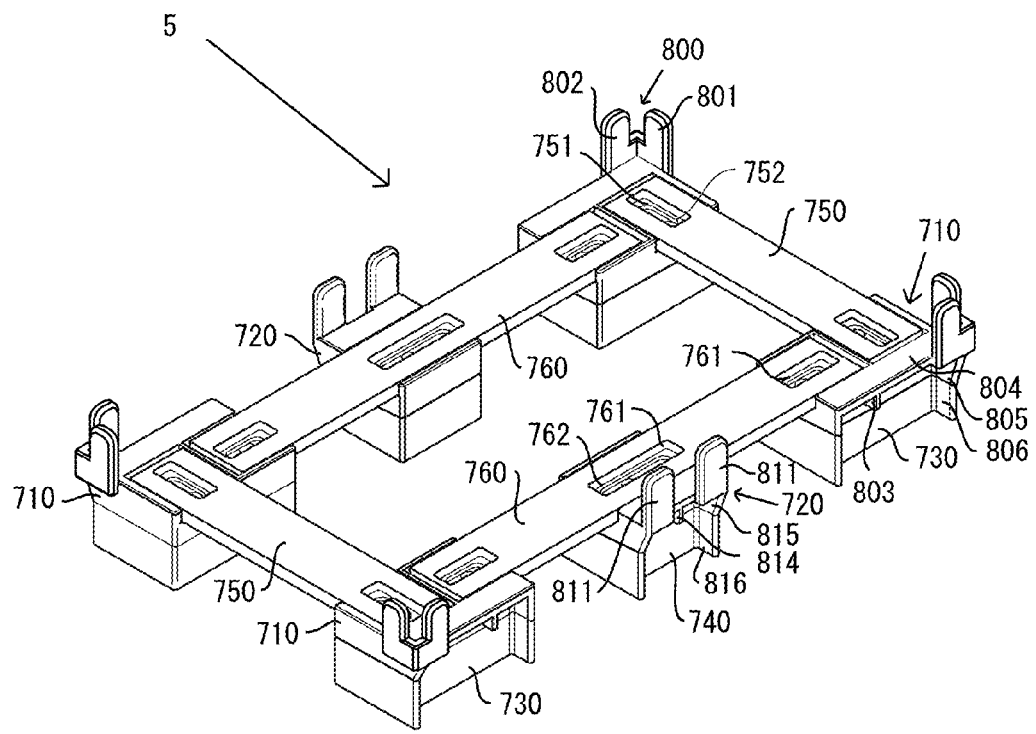
FIG. 17 is a perspective view of an effector affixing device (Embodiment 5)
Figure 18:
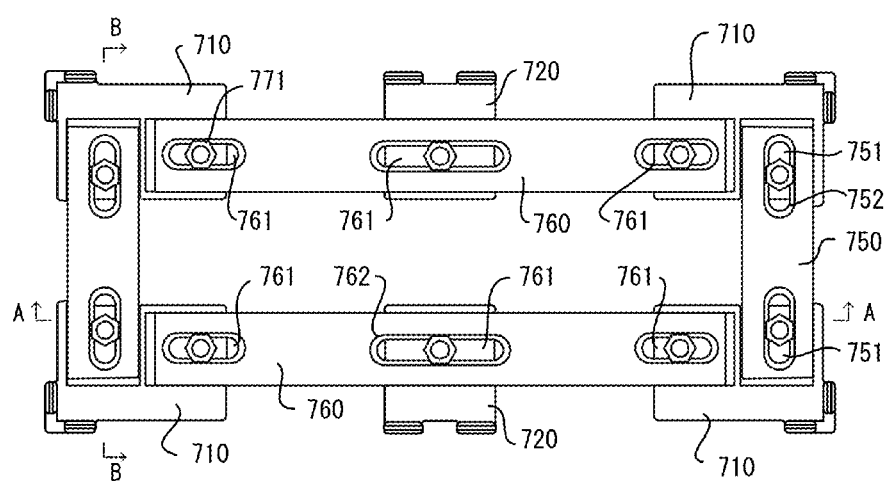
FIG. 18 is a plan view (Embodiment 5)
Figure 19:
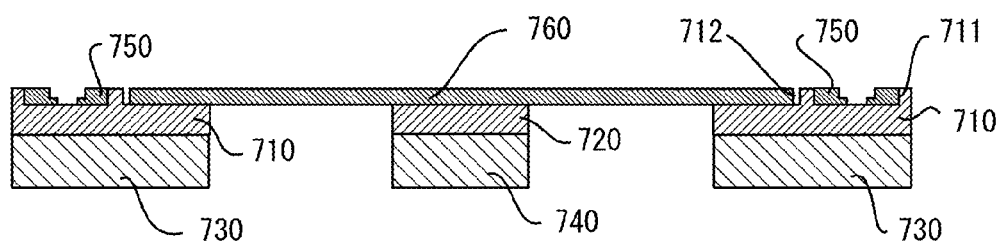
FIG. 19 is a cross-sectional view (Embodiment 5)
Figure 20:
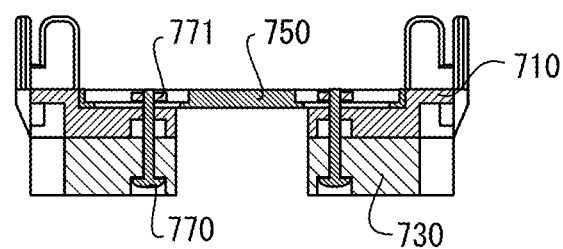
FIG. 20 is a cross-sectional view (Embodiment 5)

Embodiment 5 according to the present invention will now be described with reference to FIG. 17 to FIG. 20. FIG. 17 is a perspective view of an effector affixing device 5 according to Embodiment 5, FIG. 18 is a plan view, FIG. 19 is a cross-sectional end elevation taken along a position A-A in FIG. 18, and FIG. 20 is a cross-sectional view taken along a position B-B in FIG. 18. In the effector affixing device 5 according to Embodiment 5, an effector affixing base is divided into four corner members 710 that affix lower corner portions of an effector and two side edge members 720 that affix side edges of the effector. Separation members 730 and 740 are disposed to the lower sides of the corner members 710 and the side edge members 720 in accordance with respective members. In Embodiment 5, as different from Embodiment 4, elongated positional adjustment rails 760 are disposed to top portions of the corner members 710 and the side edge members 720 along a long-side direction of the effector, and shorter positional adjustment rails 750 are disposed along a short-side direction of the effector.

A cross-sectional shape of each positional adjustment rail is a substantially rectangular shape like Embodiment 4. Screw insertion slotted holes 751 and 761 are opened in the positional adjustment rails along the vertical direction. The screw insertion slotted holes 751 are formed in the vicinity of both ends of each shorter positional adjustment rail 750. The screw insertion slotted holes 761 are formed in the vicinity of both ends and at a substantially central portion of each elongated positional adjustment rail 760. slotted holes 752 and 762 are formed in the slotted holes, and a nut 771 is caught on each step portion (see FIG. 18 and FIG. 20).

Each corner member 710 has a substantially rectangular shape, and concave portions 711 and 712 each having a width associated with a cross-sectional dimension of the position adjustment rail are formed in a top portion of this corner member 710 along the short-side direction and the long-side direction (FIG. 19). Moreover, the nuts 771 are slidably attached to the step portions 752 and 762 of the slotted holes in the top portions of the shorter positional adjustment rail and the elongated positional adjustment rail. Additionally, each screw 770 pierces through and is inserted into the corner member and the separation member from the lower side, and it is screwed with a screw head being accommodated in a concave portion formed as a screw head accommodating portion in the bottom portion of the corner member 710. As different from Embodiment 4, in case of Embodiment 5, the screw head accommodating portion is also formed in the bottom portion of the corner member 710 (see FIG. 20). As a result, in case that a low installation height of the bottom surface of the effector affixing device can suffice, the effector affixing device can be assembled without using the separation member as described above. On the other hand, in case of assuring the separation space having a height that allows the intersection of shield lines between each positional adjustment rail and the effector board by using the separation member, the corner members 710 and the side edge members 720 are arranged to overlap below the positional adjustment rails, and the separation members 730 and 740 are further arranged to overlap below these members. Further, the screws 770 are inserted from the lower side and screwed to the nuts 771 attached to the top portions of the positional adjustment rails, whereby the effector affixing device is assembled. Here, each separation member 730 serves as a support that supports the effector affixing base.

A corner of an effector holding piece 800 erected from a corner portion of each corner member 710 is notched, and the effector holding piece is the same as that in Embodiment 4 in that the effector holding piece is divided into a holding piece 801 in the short-side direction and a holding piece 802 in the long-side direction, that a protrusion 803 is formed on a lower portion of the corner member on the outer edge side in the short-side direction to protrude downward, that an outer edge portion of a bottom plate 804 of the corner member bulges toward the lateral side, that a reinforcing piece 805 is erected near the corner of the bottom plate 804, and also in functions and effects, and hence a description on these points will be omitted in Embodiment 5. It is to be noted that the number of the reinforcing pieces may be changed and applied as a matter of course.

Each side edge member 720 also has a substantially rectangular shape, and a concave portion associated with the cross-sectional dimension of the positional adjustment rail is formed in a top portion of the side edge member 720 along the long-side direction. Furthermore, the screw 770 is inserted from the lower side into the nut 771 slidably attached to a step portion 761 in the slotted hole of the elongated positional adjustment rail through the side edge member 720 and the separation member 740 with a screw head being accommodated in a concave portion serving as a screw head accommodating portion in the bottom portion of the separation member 740 (see FIG. 20). Like the corner member 710, a screw head accommodating portion is formed in a bottom portion of the side edge member 720, and the effector affixing device can be assembled without using the separation member when a small installation height of the bottom surface of the effector affixing device is allowed.

An effector holding piece 811 erected from the side edge portion of each side edge member is divided into two pieces along the side edge. Additionally, a protrusion 814 is formed on the lateral side of the side edge member so as to protrude downward, an outer edge portion of the bottom plate is protruded, and a reinforcing piece 815 is formed at an end of the protruded portion. These points and functions of these members are equal to those of the corner member. A screw head accommodating portion is likewise formed in a bottom portion of each separation member 740 below the side edge member, and the effector affixing device is assembled so as to adjust a height of the effector affixing device like the separation member of the corner member (see FIG. 20).

A shape of the top portion of each of the separation members 730 and 740 is different from that in Embodiment 4. The corner separation member 730 is disposed to the lower side of the corner member 710, the side edge separation member 740 is disposed to the lower side of the side edge member 720, the top portion of the corner separation member can be substantially matched with the shape of the bottom surface of the corner member, and the top portion of the side edge separation member can be likewise substantially matched with the shape of the bottom surface of the side edge member. Furthermore, reinforcing pieces 806 and 816 that support the lower sides of the reinforcing pieces 805 and 815 formed on the edge portions of the protruded portions of the corner members and the side edge members and reach an effector board are provided on the side edges of the separation members. Further, in Embodiment 5, likewise, screws are inserted from the lower side and screwed to the nuts fixed on the positional adjustment rails, thereby affixing the effector affixing device.

In the effector affixing device according to Embodiment 5, likewise, before mounting an effector, the effector affixing device is temporarily assembled so as to be substantially matched with the size of the effector bottom surface, the screws are fastened while matching the positions of the corner members of the effector affixing device with the bottom surface of the effector, and the buffer member formed of the rubber ring is fitted with respect to the divided erected pieces (see FIG. 10). The effector affixing device according to Embodiment 5 can be easily assembled by vertically overlapping the respective members constituting this device, and fitting the rubber band enables to hold the effector stably on the effector affixing device.

Furthermore, the point that the effector affixing base is formed as an affixing base having a height desired by a performer when the separation member having a desired height is selected from separation members having a plurality of types of heights and then used is also the same as Embodiment 4. It is to be noted that, in case of replacing the effector with an effector whose bottom surface size is slightly smaller, a thickness and a size of the rubber ring can be changed to cope with this substitution. In Embodiment 5, the effector is affixed to the effector affixing device, then wiring lines such as shield lines are arranged along the effector board, the effector affixing device can be installed on the effector board using a hook-and-loop fastener or the like, and hence the installation of the effector affixing device is further facilitated.

(Embodiment 6)

Figure 21:
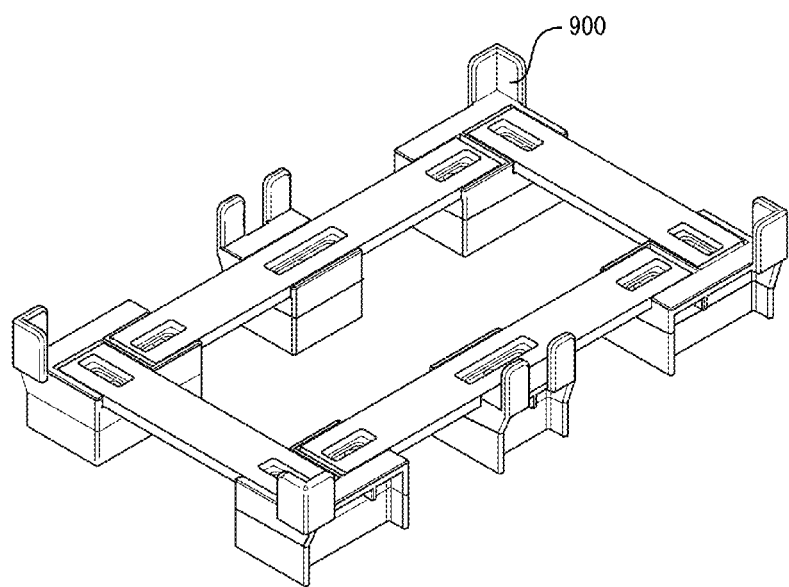
FIG. 21 is a cross-sectional view of an effector affixing device (Embodiment 6).

Although each of Embodiment 4 and Embodiment 5 comprises erected pieces obtained by dividing the effector holding piece at each corner member along the long-side direction and the short-side direction, the effector holding piece in Embodiment 5 is changed and an effector affixing device conforming to a size of a bottom surface of an effector is provided without dividing an effector holding piece 900 in Embodiment 6 shown in FIG. 21. Even in a state that the effector is kept being affixed to the effector affixing device without changing the effector, since a separation space in which shield lines intersect with each other is provided below a bottom plate of an effector affixing base, wiring lines, e.g., the shield lines are organized in this Embodiment 6, thereby facilitating operations of the effector.

(Other Embodiments)

The front and rear separation members may have different heights, the effector affixing base and the effector board may be tilted, and the separation space may include lighting means.

The effector holding piece of the effector affixing device integrated with the effector affixing base may be divided in two directions as a matter of course.

Although the lighting means is attached to the separation member in Embodiment 2, this means may be attached to any one of the effector affixing base, the corner member, the separation member, and the positional adjustment rail, this configuration can be applied to an effector affixing device in which an effector affixing base is divided and which is integrated with positional adjustment rails besides the effector affixing device integrated with the bottom plate, and providing a front tongue portion that is bent to be concave upward on the front side of the effector affixing device can suffice.

Although the effector affixing device is divided into the four corner members and the two side edge members in each of Embodiment 4 and Embodiment 5, the division number is not restricted, and dividing the effector affixing device into at least four corner members can suffice.

Although the four supports are formed on the separation member in each of Embodiment 1 to Embodiment 3, the separation member may be divided into left and right pieces or front and rear pieces to form two supports, and the divided separation members may be combined and coupled with the effector affixing base.

Embodiments disclosed herein are all illustrative examples, and it can be considered that they are not restrictive. The technical scope of the present invention is not restricted to the above explanation, it is shown by claims, and meaning equivalent to claims and all modifications of claims are intended to be included.

The invention claimed is:

1. An effector affixing device that affixes an acoustic effector on a plate material,
wherein the effector affixing device comprises: an effector affixing base provided with effector affixing means; a separation member including supports erected below the vicinities of four corners of the effector affixing base, the effector affixing base and the separation member being separably coupled with each other,
the effector affixing base comprises: a bottom plate that supports the effector; an effector holding piece erected from an edge portion of the bottom plate, and
the effector affixing device comprises a separation space having a height that at least allows shield lines to intersect with each other below the bottom plate in a state that the effector affixing base is coupled with upper portions of the supports,
wherein the bottom plate comprises depressed portions each of which is formed near each corner portion and opened downward and a groove portion that is formed on a front side of the bottom plate and opened upward,
the separation member comprises a substantially rectangular base plate that has the supports arranged near four corners thereof, the base plate having a plate body erected on a front edge portion thereof,
each depressed portion allows each support to be fitted therein,
an inner peripheral wall rear side of the depressed portion on a rear side has a locking jaw,
a jaw portion that engages with the locking jaw is provided behind a head portion of each support on the rear side,
a head portion of the plate body has a claw portion that engages with the groove portion, and
the effector affixing base is coupled with the separation member when the locking jaw of the depressed portion on the rear side engages with the jaw portion of each support on the rear side and the groove portion engages with the claw portion in a state that the supports are fitted in the depressed portions.

2. The effector affixing device according to claim 1,
wherein each effector holding piece is erected from an edge portion of each corner portion of the bottom plate and divided in two directions at a corner portion thereof, and
a buffer member is configured to be fitted between an inner side of each divided effector holding piece and an outer side of a side surface of the effector.

3. The effector affixing device according to claim 2,
wherein the effector affixing means comprises at least a pair of protrusions which are formed at both side edge portions of the effector affixing base so as to protrude downward, and a binder which abuts on an upper side and a lateral side of the effector mounted on the effector affixing base and holds the effector is configured to be attached to the protrusion by engagement.

4. The effector affixing device according claim 2,
wherein the front supports and the rear supports coupled with the effector affixing base have different heights, and the plate material and the bottom surface of the effector affixing base are coupled at a distance so as to tilt in a front-rear direction.

5. The effector affixing device according to claim 2,
wherein the effector affixing device comprises a front tongue portion which bends and is upwardly concave on the front side thereof and also comprises lighting means for reflecting light on the front tongue portion and lighting a housing front surface of the effector with the light.

6. The effector affixing device according to claim 1,
wherein the effector affixing means comprises at least a pair of protrusions which are formed at both side edge portions of the effector affixing base so as to protrude downward, and a binder which abuts on an upper side and a lateral side of the effector mounted on the effector affixing base and holds the effector is configured to be attached to the protrusion by engagement.

7. The effector affixing device according claim 6,
wherein the front supports and the rear supports coupled with the effector affixing base have different heights, and
the plate material and the bottom surface of the effector affixing base are coupled at a distance so as to tilt in a front-rear direction.

8. The effector affixing device according to claim 6,
wherein the effector affixing device comprises a front tongue portion which bends and is upwardly concave on the front side thereof and also comprises lighting means for reflecting light on the front tongue portion and lighting a housing front surface of the effector with the light.

9. The effector affixing device according claim 1,
wherein the front supports and the rear supports coupled with the effector affixing base have different heights, and
the plate material and the bottom surface of the effector affixing base are coupled at a distance so as to tilt in a front-rear direction.

10. The effector affixing device according to claim 1,
wherein the effector affixing device comprises a front tongue portion which bends and is upwardly concave on the front side thereof and also comprises lighting means for reflecting light on the front tongue portion and lighting a housing front surface of the effector with the light.

11. An effector affixing device that affixes an acoustic effector on a plate material,
wherein the effector affixing device comprises: an effector affixing base provided with effector affixing means; a separation member including supports erected below the vicinities of four corners of the effector affixing base, the effector affixing base and the separation member being separably coupled with each other,
the effector affixing base comprises: a bottom plate that supports the effector; an effector holding piece erected from an edge portion of the bottom plate, and
the effector affixing device comprises a separation space having a height that at least allows shield lines to intersect with each other below the bottom plate in a state that the effector affixing base is coupled with upper portions of the supports,
wherein the effector affixing base comprises a corner member constituted of the effector holding piece that supports each lower corner portion of the effector from three positions and the bottom plate, and it is divided into at least four pieces,
the effector affixing device comprises corner position adjusting means for enabling to change a position of each corner member in a horizontal direction in such a manner that a dimension of the bottom surface is adapted to the corners of the effector in accordance with each different effector,
the corner position adjusting means comprises two pairs of positional adjustment rails which are arranged so as to form a square as seen in a planar view, and
the positional adjustment rails slidably connect the respective corner members near corner portions of the square.

12. The effector affixing device according to claim 11,
wherein each effector holding piece is erected from an edge portion of each corner portion of the bottom plate and divided in two directions at a corner portion thereof, and
a buffer member is configured to be fitted between an inner side of each divided effector holding piece and an outer side of a side surface of the effector.

13. The effector affixing device according to claim 12,
wherein the effector affixing means comprises at least a pair of protrusions which are formed at both side edge portions of the effector affixing base so as to protrude downward, and a binder which abuts on an upper side and a lateral side of the effector mounted on the effector affixing base and holds the effector is configured to be attached to the protrusion by engagement.

14. The effector affixing device according claim 12,
wherein the front supports and the rear supports coupled with the effector affixing base have different heights, and
the plate material and the bottom surface of the effector affixing base are coupled at a distance so as to tilt in a front-rear direction.

15. The effector affixing device according to claim 12,
wherein the effector affixing device comprises a front tongue portion which bends and is upwardly concave on the front side thereof and also comprises lighting means for reflecting light on the front tongue portion and lighting a housing front surface of the effector with the light.

16. The effector affixing device according to claim 11,
wherein the effector affixing means comprises at least a pair of protrusions which are formed at both side edge portions of the effector affixing base so as to protrude downward, and a binder which abuts on an upper side and a lateral side of the effector mounted on the effector affixing base and holds the effector is configured to be attached to the protrusion by engagement.

17. The effector affixing device according claim 16,
wherein the front supports and the rear supports coupled with the effector affixing base have different heights, and
the plate material and the bottom surface of the effector affixing base are coupled at a distance so as to tilt in a front-rear direction.

18. The effector affixing device according to claim 16,
wherein the effector affixing device comprises a front tongue portion which bends and is upwardly concave on the front side thereof and also comprises lighting means for reflecting light on the front tongue portion and lighting a housing front surface of the effector with the light.

19. The effector affixing device according claim 11,
wherein the front supports and the rear supports coupled with the effector affixing base have different heights, and
the plate material and the bottom surface of the effector affixing base are coupled at a distance so as to tilt in a front-rear direction.

20. The effector affixing device according to claim 11,
wherein the effector affixing device comprises a front tongue portion which bends and is upwardly concave on the front side thereof and also comprises lighting means for reflecting light on the front tongue portion and lighting a housing front surface of the effector with the light.

* * * * *